United States Patent [19]

Kato et al.

[11] Patent Number: 5,589,990

[45] Date of Patent: Dec. 31, 1996

[54] LIGHT EMITTING ELEMENT MODULE AND MANUFACTURING METHOD THEREFOR

[75] Inventors: Takashi Kato; Hiromi Nakanishi, both of Kanagawa, Japan

[73] Assignee: Sumitomo Electric Industries, Ltd., Osaka, Japan

[21] Appl. No.: 481,100

[22] Filed: Jun. 7, 1995

[30] Foreign Application Priority Data

Jun. 14, 1994 [JP] Japan ................................ 6-155173

[51] Int. Cl.$^6$ ............................................ G02B 27/02
[52] U.S. Cl. ........................ 359/799; 359/811; 359/819
[58] Field of Search ............................ 359/798, 799, 359/800, 809, 810, 811, 819, 822, 825, 830, 894

[56] References Cited

U.S. PATENT DOCUMENTS 5,040,885  8/1991  Simms ................................ 359/800
5,079,646  1/1992  Schwartz .............................. 359/894
5,172,978  12/1992  Nomura et al. ....................... 359/799
5,191,481  3/1993  Takizawa et al. ..................... 359/811

*Primary Examiner*—Loha Ben
*Attorney, Agent, or Firm*—Cushman Darby & Cushman IP Group of Pillsbury Madison & Sutro, LLP

[57] ABSTRACT

In a light emitting element module of the present invention, a lens as an optical system for coupling an optical fiber with light emitted from a light emitting element mounted on a substrate is provided for the light emitting element, and the distance between the light emitting element and the lens is defined by a spacer inserted between the substrate and a holder for the lens mounted on the substrate. When this light emitting element module is manufactured, the distance between the light emitting element and the lens is desirably adjusted by properly selecting the thickness of the spacer to be used at that time.

5 Claims, 4 Drawing Sheets

LIGHT EMITTING ELEMENT MODULE AND MANUFACTURING METHOD THEREFOR

BACKGROUND OF THE INVENTION

1. Field of the Invention

The present invention relates to a light emitting element module. Particularly, the invention relates a light emitting element module in which a light emitting element, an optical fiber and an optical system inserted therebetween are formed integrally with each other.

2. Description of the Related Art

FIGS. 4A to 4D are diagrams for explaining a general method of mounting an optical system in a light emitting element module which is a subject of the present invention.

As shown in FIGS. 4A, in a light emitting element module as such a type, a light emitting element 3 is mounted, through a chip carrier 2, on a horizontal portion 1a of a substrate 1 having an L-shaped section as a whole. On the other hand, a through hole 1c is formed in a vertical portion 1b of the substrate 1 so that the light emitting element 3 is generally located at the center of the hole.

With respect to the light emitting element 3 mounted on the substrate 1 as mentioned above, a lens 6 for focusing light emitted from the light emitting element 3 is attached to the vertical portion of the substrate 1 through a cylindrical member 4 in a state that the lens 6 is held in a lens holder 5, as shown in FIG. 4B. The lens holder 5 itself has a cylindrical shape, and the outer diameter thereof is smaller than the inner diameter of the through hole 1c of the substrate 1. The cylindrical member 4 has a flange portion 4a having an outer diameter larger than the inner diameter of the through hole formed in the substrate 1, and a cylindrical holder support portion 4b having an inner diameter into which the lens holder 5 can be inserted.

The above-mentioned parts are assembled in the following process.

First, the lens holder 5 is inserted into the cylindrical member 4, and the flange portion 4a of the cylindrical member 4 is brought into contact with the vertical portion 1b of the substrate 1 so that the top end of the lens holder 5 is inserted into the through hole 1c of the substrate 1. At this time, the respective members are in a state that they can be moved relatively to each other. That is, if the lens holder 5 is moved inside the cylindrical holder 4, the distance between the light emitting element 3 and the lens 6 can be adjusted. Further, if the flange portion 4a of the cylindrical member 4 is slid on the surface of the vertical portion 1b of the substrate 1, the direction of a light beam which has passed the lens 6 can be adjusted. After the distance and the direction of the light beams are adjusted thus respectively, the members are fixed relative to each other. Consequently, the mounting of the lens 6 is completed. An assembly as shown in FIG. 4C is finished thus.

Generally, it is preferable in a light emitting element module that the light output of a light emitting element can be taken out in the form of an optical fiber output as much as possible.

FIG. 5 shows the relationship between a relative value of the optical fiber output and a change of the distance between a lens and a semiconductor lens.

As shown in the drawing, the distance which makes the optical fiber output maximum depends on the specifications of the optical system and the light emitting element, and the optical fiber output is reduced if the distance is out of the optimum distance.

In the above-mentioned conventional assembling method, it is possible to easily adjust the distance between the light emitting element 3 and the lens 6. However, if laser welding or the like is used for fixing the lens holder 5 and the cylindrical member 4 with each other, there is a case where the adjusted distance may be changed due to the thermal deformation of a welded portion. Therefore, even if the working of the adjustment is performed carefully, there is a case where the adjustment is not reflected on the characteristics of final products.

In addition, since it is necessary to make the through hole 1c of the substrate, the cylindrical member 4 and the lens holder slide on or rub with each other, it is necessary to provide a gap 20 particularly between the inner surface of the cylindrical member 4 and the outer surface of the lens holder 5 as shown in FIG. 6. Owing to this gap, the lens holder 5 may be fixed inside the cylindrical member 4 with an inclination. Accordingly, it results in deterioration of the characteristics of final products.

As described above, in the configuration of a conventional light emitting element module and the assembling method therefor, the result of the adjustment performed at the time of assembling is not always reflected on the characteristics of products, so that the yield of the products has been by no means high. In addition, this low yield has caused the increase of the cost of final products.

SUMMARY OF THE INVENTION

It is an object of the present invention to provide a novel configuration of a light emitting element module and an assembling method therefor in which both the working of assembling and the working of adjustment are easy, and the result of the working of adjustment can be maintained well till final products are obtained.

In order to accomplish the above object, the light emitting element module includes a substrate; a light emitting element mounted on the substrate; a lens as an optical system for focusing or artificially collimating light emitted from the light emitting element; a lens holder for holding the lens therein; and a spacer provided between the substrate and the lens holder for defining a distance between the light emitting element and the lens.

As described above in detail, it is easy to adjust an optical system in the light emitting element module according to the present invention because of its peculiar structure for fixing a lens belonging thereto, and the result of the adjustment is reflected on final products well. It is therefore possible to manufacture a light emitting element module high in the level of optical fiber output with a high productivity, so that it is possible to reduce the cost of the product.

BRIEF DESCRIPTION OF THE DRAWINGS

In the accompanying drawings.

PREFERRED EMBODIMENTS OF THE INVENTION

The preferred embodiments of the present invention will be described more specifically with reference to the drawings. However, the following disclosure is an example of the present invention, and it does not limit the technical scope of the present invention.

Figure 1A:
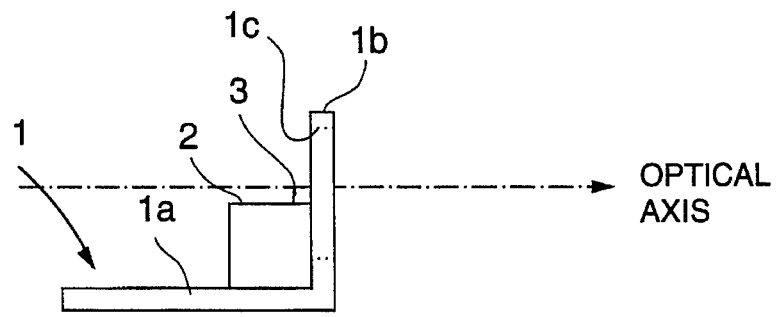
FIGS. 1A to 1C are diagrams illustrating an embodiment of the light emitting element module according to the present invention, and an assembling method therefor.
Figure 1B:
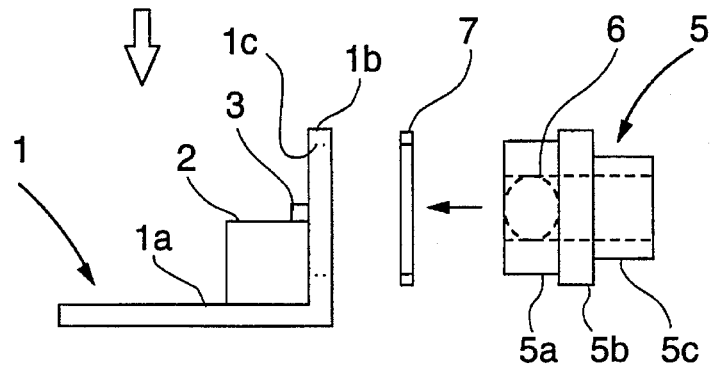
Figure 1C:
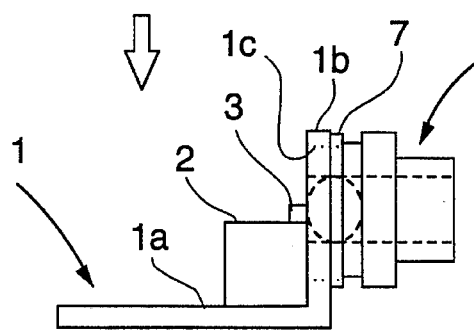

FIGS. 1A to 1c are diagrams showing an embodiment of the configuration of the light emitting element module according to the present invention and an assembling method therefor. In FIGS. 1A to 1C, the same elements as those in the conventional light emitting element module shown in FIG. 4 are designated by the same numerals.

More specifically, FIG. 1 is a diagram illustrating, in enlargement, a mount portion of a Peltier effect element in the light emitting element according to the present invention.

Figure 4A:
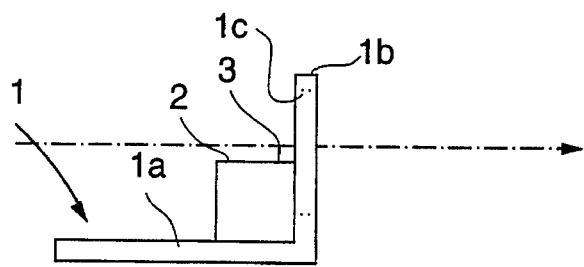
FIGS. 4A to 4C are diagrams illustrating the structure of attaching a lens in a conventional light emitting element module, and an assembling method therefor.
Figure 4B:
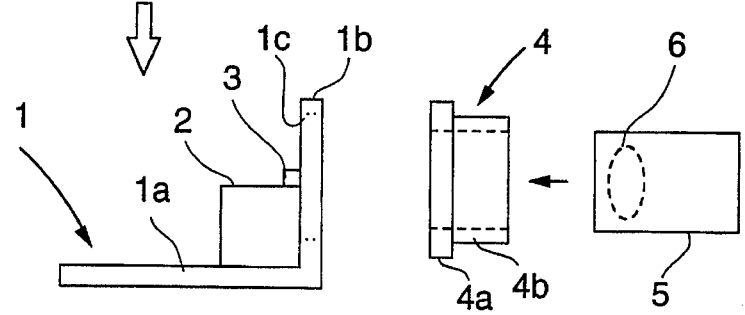
Figure 4C:
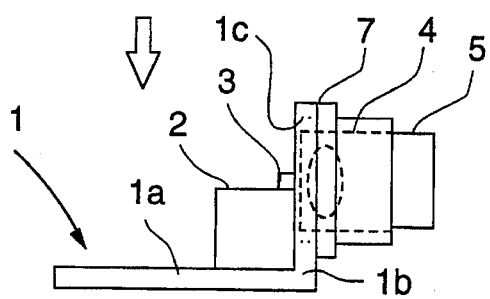
Figure 5:
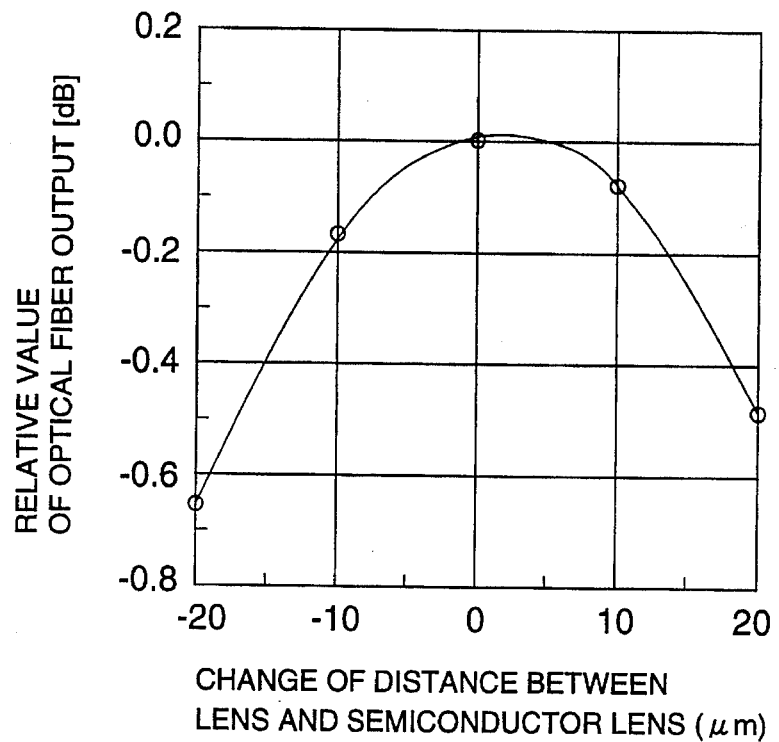
FIG. 5 is a graph showing a relative value of the change of optical fiber output caused by the change of the distance between a light emitting element and a lens.
Figure 6:
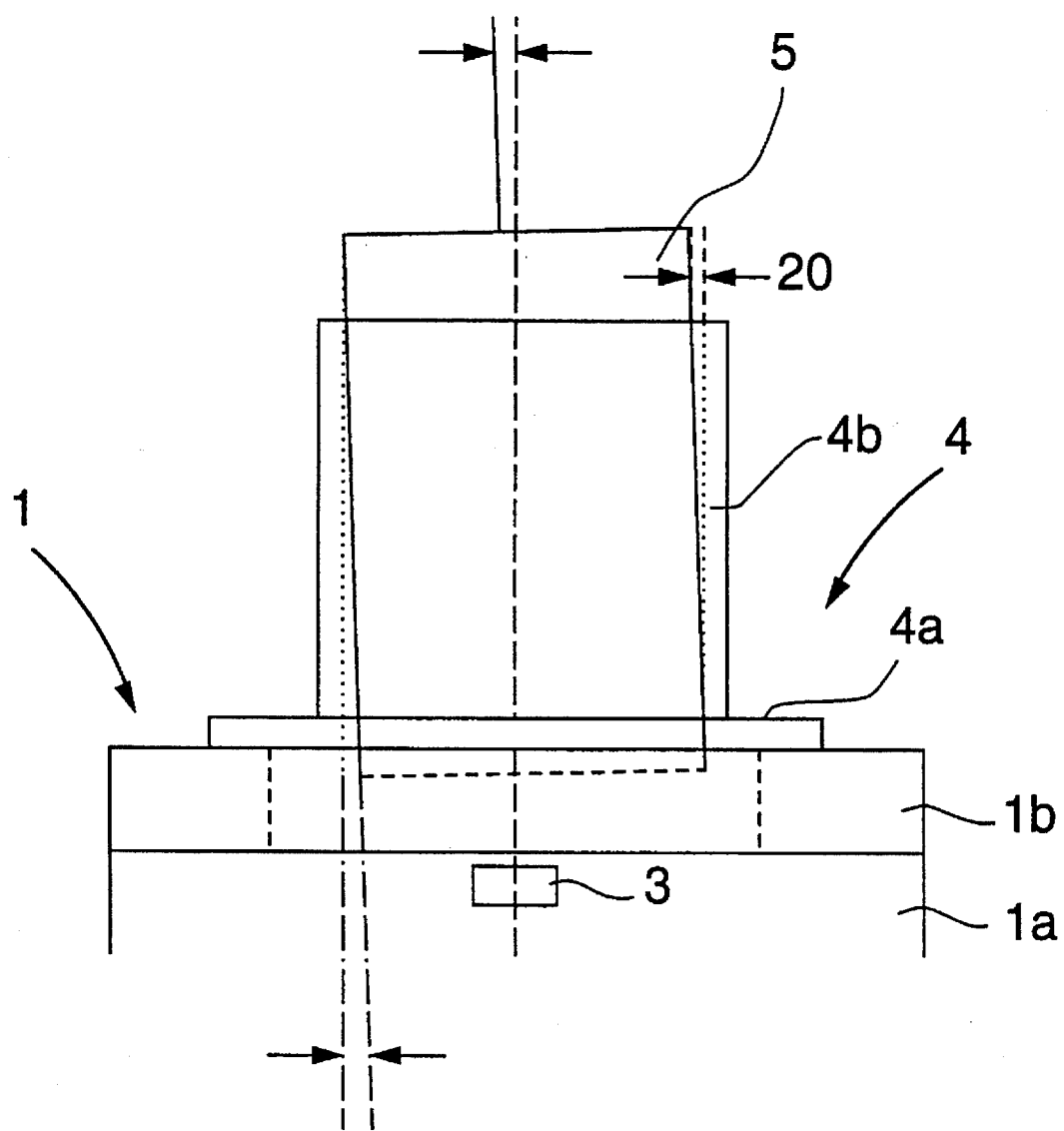
FIG. 6 is a diagram for explaining obstacles occurring in a light emitting element module having a conventional structure.

As shown in FIG. 1A, the configuration of an assembly used herein is constituted by a substrate 1, a chip carrier 2 and a light emitting element 3 basically in common with the conventional light emitting element module shown in FIG. 4. This light emitting element module is common with the conventional one also in the point that a through hole 1c is formed in a vertical portion 1b of the substrate 1.

The feature of this light emitting element module is in the shape of a lens holder 5 and in the use of a spacer 7 which will be described later.

That is, the lens holder 5 used in this light emitting element module has an insertion portion 5a formed in the top end portion thereof, a cylindrical portion 5c formed in the rear end portion thereof, and a flange portion 5b formed between those portions 5a and 5c, as shown in FIG. 1B. The insertion portion 5a has an outer diameter sufficiently smaller than the inner diameter of the through hole 1c formed in the vertical portion 1b of the substrate 1. On the other hand, the flange portion 5b has an outer diameter sufficiently larger than the inner diameter of the through hole 1c of the substrate 1, and designed so that the spacer 7 is provided between the flange portion 5b and the surface of the vertical portion 1b of the substrate 1 when the insertion portion 5a is inserted into the through hole 1c.

A ring-shaped spacer 7 has an inner diameter slightly larger than the outer diameter of the insertion portion 5a of the lens holder 5, and is provided so as to be inserted between the flange portion 5b of the lens holder 5 and the vertical portion 1b of the substrate as will be described later.

The light emitting element module according to the present invention, which is constituted by the above-mentioned members, is assembled in the following process.

First, in the state where the spacer 7 is attached to the insertion portion 5a of the lens holder 5, the insertion portion of the lens holder 5 is inserted into the through hole 1c of the substrate 1. At this time, the spacer 7 is selected so as to have a thickness to make the distance between the light emitting element 3 and a lens 6 an optical system for focusing or artificially collimating light emitted from the light emitting element 3 be a predetermined value. Since there is an inevitable tolerance in an actual case, a plurality of spacers different in thickness are prepared in advance so that a desired one of the spacers may be selected and used in accordance with monitoring a light beam having passed the lens 6. After the insertion of the selected spacer, only the adjustment of matching the optical axis of the lens 6 with the light emitting element 3 is performed. After the positioning of the optical axis is completed by this adjustment, the substrate 1, the spacer 7 and the lens holder 5 are fixed to each other. An assembly as shown in FIG. 1C is finished thus. In addition, a preferable material for forming the spacer 7 is a metal such as stainless, covar, copper-tungsten alloy. Due to using such a material, when the lens holder is fixed by the laser welding, the flange portion 5a of the lens holder 5, the spacer 7 and the substrate 1 are melted and integrated together so that the welded portion has a strong strength. However, if ceramics or hard plastic is used for the spacer 7, the strength of the welded portion is not stronger than that of the above case. In addition, the material easy to deform is not preferable to the spacer 7, because its thickness is not to be constant.

Figure 2:
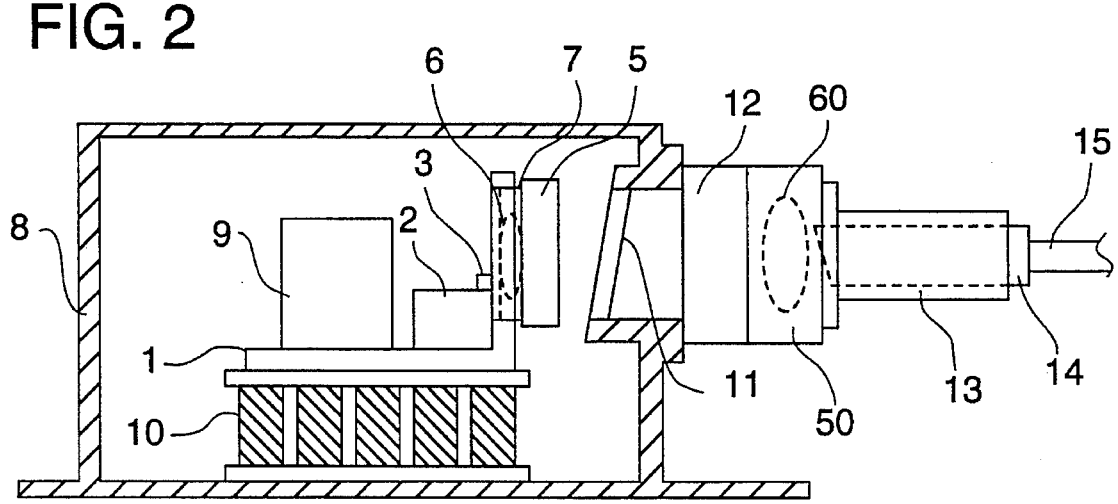
FIG. 2 is a diagram illustrating the whole of the light emitting element module according to the present invention.

FIG. 2 is a diagram illustrating an example of the whole configuration of a light emitting element module including a lens of the above embodiment according to the present invention.

As shown in the same drawing, an assembly basically having the same configuration as the assembly shown in FIG. 1C is used in this light emitting element module. In the assembly used here, however, a monitoring photodiode 9 is mounted in the rear of a light emitting element 3 on a substrate 1. This assembly as a whole is mounted on the bottom portion of a package 8 through a Peltier effect element 10 for controlling temperature. In addition, a window sealed with a hermetic glass 11 is formed at one end of the package 8, and an isolator 12, a second lens 60 with its holder 50, and a ferrule holder 13 are coupled with the outside of the window sequentially. In addition, a ferrule 14 mounted on the top end of a photodiode 15 coupled finally is inserted into the ferrule holder 13. Thus, the photodiode 15 is mounted.

Figure 3A:
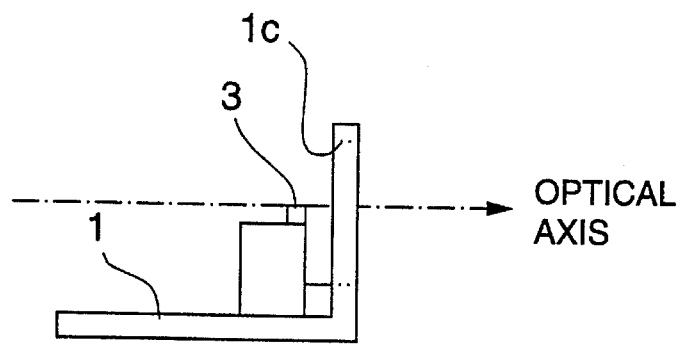
FIGS. 3A to 3C are diagrams illustrating another embodiment of the light emitting element module according to the present invention, and an assembling method therefor.
Figure 3B:
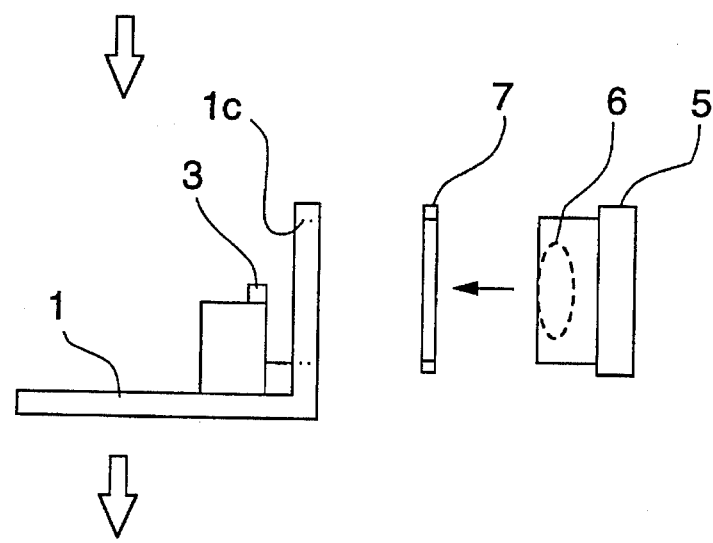
Figure 3C:
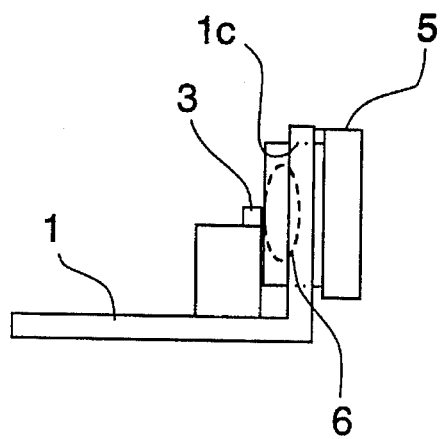

FIGS. 3A to 3C are diagrams illustrating another embodiment of the light emitting element module according to the present invention. In FIGS. 3A to 3C, constituent parts the same as those in the -other embodiments are referenced correspondingly.

As shown in FIG. 3C, a chip carrier is not used in an assembly used here and constituted by a substrate 1 and a light emitting element 3, unlike the embodiment shown in FIG. 1. Therefore, the light emitting element 3 is mounted directly on a horizontal portion of a substrate 1. Practically a wiring pattern is provided on the substrate 1, so as to enable wiring directly from electrodes of the light emitting element. Therefore, from the point of using no chip carrier, the light emitting element module having such a configuration can be manufactured with a cost lower than that having the configuration shown in FIG. 1.

Excepting the above-mentioned assembly constituted by the light emitting element 3 and the substrate 1, the light emitting element module shown in FIG. 3 has a configuration common with that shown in FIG. 1. Therefore, as shown in FIG. 3B, the distance between the light emitting element 3 and a lens 6 can be defined by inserting a spacer 7 between a vertical portion 1b of the substrate 1 and a flange portion of a lens holder 5. In addition, the optical axis of the lens 6 can be adjusted by moving the lens holder 5 in the state where the flange portion of the lens holder 5 is brought into contact with the vertical portion 1b of the substrate 1 through the spacer 7. After that, the respective members are fixed, and such an assembly as shown in FIG. 3C is completed.

That is, in the light emitting element module according to the present invention, the lens holder is inserted directly into the through hole formed in the vertical portion of the substrate. In addition, the flange portion much larger than the inner diameter of the through hole is formed at the rear of the lens holder, and the distance between the light emitting element and the lens is restrained by the ring-shaped spacer inserted between this flange portion and the vertical portion of the substrate. Therefore, respective slight portions of the substrate vertical portion, the spacer and the flange portion are melted by laser welding or the like so as to be fixed integrally with each other, so that the distance defined by the spacer is finally maintained. In addition, being supported by the flange portion, the lens holder cannot be inclined.

What is claimed is:

1. A light emitting element module comprising:

a substrate, said substrate including a portion having a through hole;

a light emitting element mounted on said substrate;

a lens as an optical system for at least one of the focusing and artificially collimating light emitted from said light emitting element;

a lens holder for holding said lens therein, said lens holder having an insertion portion for being inserted in said through hole and a flange portion having an outer diameter larger than an inner diameter of said through hole; and a spacer inserted between said portion of said substrate and said flange portion of said lens holder for defining a distance between said light emitting element and said lens.

2. A light emitting element module according to claim 1, wherein said substrate includes a horizontal portion on which said light emitting element is mounted, and a vertical portion rising from one end of said horizontal portion, wherein said portion having a through hole is said vertical portion;

said insertion portion of said lens holder having an outer diameter smaller than the inner diameter of said through hole, said lens holder being integrally provided with said insertion portion and said flange portion; and said spacer has a ring-like shape having an inner diameter substantially equal to the outer diameter of said insertion portion and an outer diameter larger than the inner diameter of said through hole.

3. A light emitting element module according to claim 2, wherein said lens holder 5 has said insertion portion formed in the top end portion thereof, a cylindrical portion formed in the rear end portion thereof, and said flange portion formed between said insertion portion and said cylindrical portion.

4. A manufacturing method for a light emitting element module provided with a lens as an optical system for focusing or artificially collimating light emitted from a light emitting element mounted on a substrate comprising the steps of:

providing a spacer having a desired thickness between said substrate and a lens holder for holding said lens to define the distance between said light emitting element and said lens;

inserting an insertion portion of said lens holder in a through hole of said substrate;

performing an adjustment of matching an optical axis of said lens with said light emitting element; and fixing said substrate, said spacer and said lens holder to each other.

5. A manufacturing method for a light emitting element module according to claim 4, wherein said substrate has a horizontal portion on which said light emitting element is mounted, and a vertical portion having said through hold and rising from one end of said horizontal portion;

said lens holder is integrally provided with said insertion portion having an outer diameter smaller than the inner diameter of said through hole, and a flange portion having a outer diameter larger than the inner diameter of said through hole;

said spacer has a ring-like shape having an inner diameter substantially equal to the outer diameter of said insertion portion and an outer diameter larger than the inner diameter of said through hole.

* * * * *